United States Patent
Katsuki (10) Patent No.: US 9,925,607 B2
(45) Date of Patent: Mar. 27, 2018

(54) HELICAL BROACH

(71) Applicant: MITSUBISHI HEAVY INDUSTRIES MACHINE TOOL CO., LTD., Ritto-shi, Shiga (JP)

(72) Inventor: Yasuhito Katsuki, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 80 days.

(21) Appl. No.: 14/651,380

(22) PCT Filed: Dec. 18, 2013

(86) PCT No.: PCT/JP2013/083821
§ 371 (c)(1),
(2) Date: Jun. 11, 2015

(87) PCT Pub. No.: WO2014/125728
PCT Pub. Date: Aug. 21, 2014

(65) Prior Publication Data
US 2015/0336192 A1  Nov. 26, 2015

(30) Foreign Application Priority Data
Feb. 14, 2013  (JP) .................................. 2013-026276

(51) Int. Cl.
*B23D 37/00* (2006.01)
*B23F 21/26* (2006.01)
(Continued)

(52) U.S. Cl.
CPC .......... *B23F 21/264* (2013.01); *B23D 43/005* (2013.01); *B23D 43/04* (2013.01);
(Continued)

(58) Field of Classification Search
CPC ...... B23D 37/16; B23D 43/00; B23D 43/005; B23D 43/04; B23D 2043/063; B23F 21/26; B23F 21/262
See application file for complete search history.

(56) References Cited

U.S. PATENT DOCUMENTS 2,060,889 A  * 11/1936  Nilsson ................ B23D 43/005
407/18
2,987,801 A  *  6/1961  Psenka ................... B23D 43/02
407/16
(Continued)

FOREIGN PATENT DOCUMENTS

JP        49-63570 A     6/1974
JP        2-43125 U      3/1990
(Continued)

OTHER PUBLICATIONS

International Preliminary Report on Patentability dated Aug. 27, 2015, for International Application No. PCT/JP2013/083821.
(Continued)

*Primary Examiner* — Will Fridie, Jr.
(74) *Attorney, Agent, or Firm* — Birch, Stewart, Kolasch & Birch, LLP (57) ABSTRACT

The shell of this helical broach (1) is formed by stacking a plurality of wafer shells ($20_{W(1)}$-$20_{W(N)}$) in the axial direction, and is obtained by forming on the wafer shells ($20_{W(1)}$-$20_{W(N)}$) finishing blades ($30_{W(1)}$-$30_{W(N)}$) corresponding to teeth grooves on a piece to be cut (W) and forming the finishing blades ($30_{W(1)}$-$30_{W(N)}$) such that the blade width gradually increases with each of the aforementioned wafer shells ($20_{W(1)}$-$20_{W(N)}$) from the leading end of the cutting direction toward the trailing end of the cutting direction.

4 Claims, 4 Drawing Sheets

(51) Int. Cl.
 B23D 43/04 (2006.01)
 B23D 43/00 (2006.01)

(52) U.S. Cl.
 CPC ......... *B23F 21/26* (2013.01); *Y10T 407/1628* (2015.01); *Y10T 407/1685* (2015.01)

(56) References Cited

U.S. PATENT DOCUMENTS

| | | | | |
|---|---|---|---|---|
| 3,178,800 | A * | 4/1965 | Psenka | B23D 43/00 407/16 |
| 3,227,008 | A * | 1/1966 | Celovsky | B23D 43/00 219/69.17 |
| 3,270,395 | A * | 9/1966 | Bonnafe | B23D 43/005 407/15 |
| 3,795,958 | A | 3/1974 | Psenka | |
| 5,672,035 | A * | 9/1997 | Pawlik | B23D 37/005 384/900 |
| 6,408,557 | B1 * | 6/2002 | Zaeper | B23D 43/005 42/76.1 |
| 2002/0182017 | A1 * | 12/2002 | Miller | B23D 43/04 407/13 |
| 2010/0031799 | A1 * | 2/2010 | Ast | B23B 27/06 83/875 |
| 2013/0156513 | A1 * | 6/2013 | Yoshizumi | B23D 43/005 407/13 |
| 2016/0250702 | A1 * | 9/2016 | Yamaya | B23D 43/02 |

FOREIGN PATENT DOCUMENTS

| | | |
|---|---|---|
| JP | 4-28919 U | 3/1992 |
| JP | 2005-144639 A | 6/2005 |

OTHER PUBLICATIONS

International Search Report and Written Opinion of the International Searching Authority (Forms PCT/ISA/210, PCT/ISA/237 and PCT/ISA/220) dated Jan. 21, 2014, for International Application No. PCT/JP2013/083821 with the English translation.

* cited by examiner

HELICAL BROACH

TECHNICAL FIELD

The present invention relates to a helical broach.

BACKGROUND ART

As a working method of cutting an internal gear which is a type of gear, there is broaching in which a broach is used as a cutting tool in which blades are arranged in a saw shape (for example, PTL 1). This is internal work performed on a workpiece by installing, in a broaching machine as a working machine dedicated to broaching, a broach and the workpiece as a piece to be cut, and pulling the broach with respect to the workpiece or pulling the workpiece with respect to the fixed broach.

A broach is a bar-shaped bladed material in which a large number of cutting blades are arranged to be formed in a saw shape, and the cutting blades of the broach are arranged in dimensional order such that the height and the blade width of the blades gradually increase from one end side (the leading end of the cutting direction) toward the other end side (the trailing end of the cutting direction). One of the features of the broach is that various working processes can be combined in a single cutting tool. For example, in a case where a broach having a roughing section for roughing of the workpiece and a finishing section for finishing of the workpiece is used, in the broaching machine, roughing and finishing are completed only by pulling the broach with respect to the workpiece once such that the workpiece can be formed to an internal gear.

Since broaching is performed by only pulling the workpiece or the broach once, working speed from roughing to finishing of the workpiece is faster than that of other internal work. In addition, the finished dimensions of the workpiece by broaching become substantially the same as those of the final blades of the broach used for working, and thus cutting work can be performed with high accuracy and the repetition accuracy of the cutting work is high.

As a type of broach, there is a helical broach. This is for cutting a workpiece to a helical internal gear in which the tooth lead of the internal gear is inclined with respect to the axis of the gear. The helical broach and the workpiece are installed on a broaching machine and the helical broach is pulled with respect to the workpiece while being rotated, thereby forming the workpiece to the helical internal gear.

Figure 4:
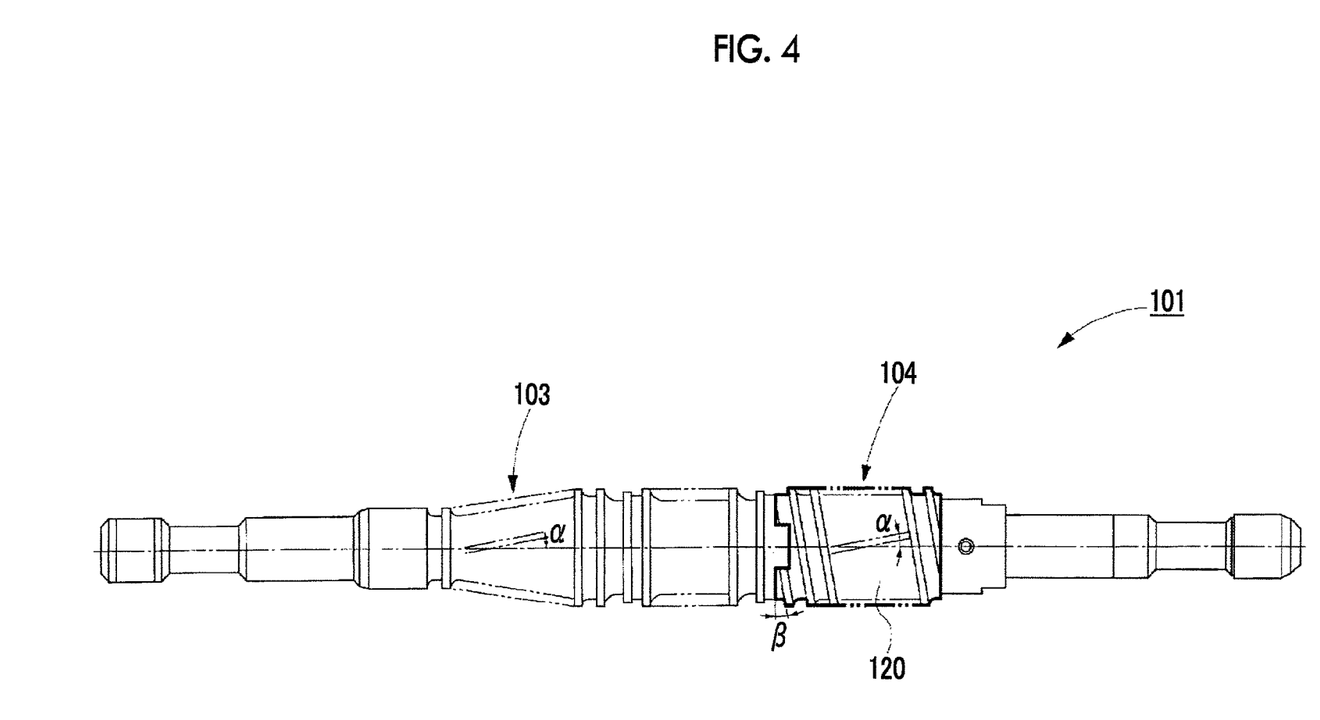
FIG. 4 is a side view illustrating an example of an existing helical broach.
Figure 5:
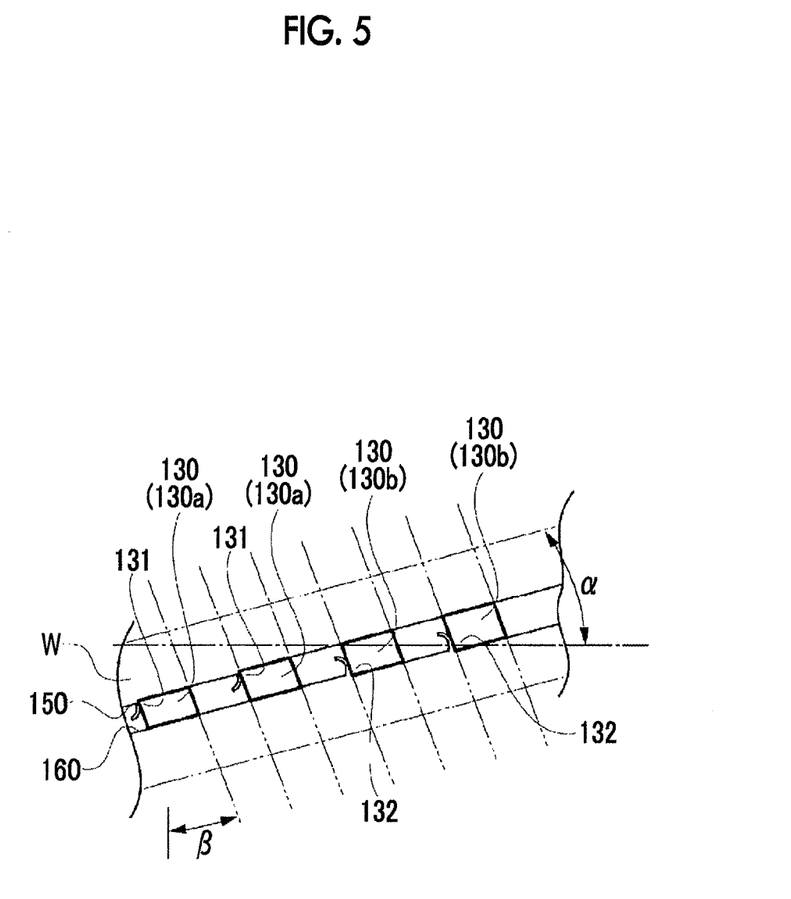
FIG. 5 is an explanatory view illustrating an example of finishing by the existing helical broach.

An example of an existing helical broach is illustrated in FIG. 4, and finishing of a workpiece by the existing helical broach is illustrated in FIG. 5.

As illustrated in FIG. 4, a helical broach 101 includes a roughing section 103 and a finishing section 104, and roughing blades (not illustrated) in the roughing section 103 and finishing blades 130 (FIG. 5) in the finishing section 104 are arranged to be inclined with respect to the axial direction of the helical broach 101.

In the roughing blades (not illustrated) in the roughing section 103 and the finishing blades 130 in the finishing section 104, a tooth gear helix angle $\alpha$ is set along the tooth lead direction of the helical internal gear to be formed. In order to enhance the working accuracy and the like, in the finishing blades 130 in the finishing section 104, a blade groove helix angle $\beta$ may further be set.

In addition, the blade groove helix angle $\beta$ is set to a direction that is not perpendicular to the direction of the tooth gear helix angle $\alpha$ in order to enhance the working accuracy and the like. Therefore, as illustrated in FIG. 5, one end portion 131 in the finishing blade 130 has an acute angle, and the other end portion 132 has an obtuse angle.

In addition, in order to enhance the working accuracy and the like, in the finishing section 104 of the helical broach 101, a single finishing blade 130 is set to abut and cut only one of tooth surfaces including a left tooth surface 150 in a workpiece W (one tooth surface along the tooth lead of the workpiece W) and a right tooth surface 160 (the other tooth surface along the tooth lead of the workpiece W). That is, the finishing blades 130 in the finishing section 104 of the helical broach 101 are set to be divided into left tooth surface finishing blades 130a which cut only the left tooth surfaces 150 in the workpiece W and right tooth surface finishing blades 130b which cut only the right tooth surfaces 160 in the workpiece W.

The finishing section 104 needs a necessary number of left tooth surface finishing blades 130a and right tooth surface finishing blades 130b for forming the workpiece W to a helical internal gear having predetermined dimensions, and the left tooth surface finishing blades 130a and the right tooth surface finishing blades 130b are arranged along the tooth gear helix angle $\alpha$. Therefore, a shell 120 is elongated in the axial direction.

CITATION LIST

Patent Literature

[PTL 1] Japanese Patent Application Publication No. 2005-144639

SUMMARY OF INVENTION

Technical Problem

In a case where at least a portion of the finishing blades 130 in the shell 120 cannot cut the workpiece W to predetermined dimensions due to damage, wear, and the like, the shell 120 has to be replaced regardless of the state of the other portions of the finishing blades 130 in the shell 120. The shell 120 is long and precise and is thus an expensive cutting tool, and the replacement of the shell 120 in the broach requires high cost.

As a matter of course, the finishing blades 130 may also be re-ground to achieve a state in which the shell 120 is usable. However, when the re-grinding is repeated, the blade width of the finishing blades 130 decreases, and thus the shell 120 for broaching does not return to a usable state.

In the invention described in PTL 1, a helical broach is provided with finishing blades capable of cutting both tooth surfaces of the workpiece W. Therefore, compared to the shell 120 in the existing helical broach 101 illustrated in FIG. 4, the axial length of the shell according to the invention described in PTL 1 is halved, and thus the manufacturing cost and replacement cost of the shell can be suppressed in half. However, the shell according to the invention described in PTL 1 is a sufficiently long cutting tool, and the manufacture and replacement thereof requires high cost.

The present invention has been made taking the foregoing problems into consideration, and an object thereof is to significantly suppress the cost of replacement of a shell in a helical broach due to damage, wear, and the like of finishing blades.

Solution to Problem

A helical broach according to a first invention to solve the problems is a helical broach including: a cylindrical shell in which finishing blades having a predetermined tooth gear helix angle are formed on an outer peripheral side, in which the shell includes a plurality of wafer shells and has a structure divided in an axial direction, the wafer shells have finishing blades corresponding to tooth grooves in a piece to be cut, and in the finishing blades in the plurality of wafer shells, a blade width gradually increases with each of the wafer shells from a leading end of a cutting direction toward a trailing end of the cutting direction.

A helical broach according to a second invention to solve the problems is the helical broach according to the first invention, in which, in a case where the finishing blade provided in the wafer shell positioned at a rearmost end of the cutting direction is in a state of being unable to cut the piece to be cut to predetermined dimensions, a new wafer shell is inserted into the rearmost end of the cutting direction, and the wafer shell positioned at a foremost end of the cutting direction is removed and installation positions of the wafer shells assembled and arranged in the axial direction are moved toward the leading end of the cutting direction, thereby forming a new shell.

A helical broach according to a third invention to solve the problems is the helical broach according to the first invention, in which the finishing blades in the wafer shells cut both tooth surfaces along a tooth lead in the piece to be cut.

A helical broach according to a fourth invention to solve the problems is the helical broach according to the third invention, in which all of tool angles at which the finishing blades in the wafer shells abut both of the tooth surfaces along the tooth lead in the piece to be cut are acute angles.

Advantageous Effects of Invention

According to the helical broach according to the first invention, since the shell has the structure divided in the axial direction, in a case where a portion of the finishing blades in the divided wafer shells cannot cut the piece to be cut to predetermined dimensions due to damage, wear, and the like, only the wafer shells having the portion of the finishing blades may be replaced. Therefore, the replacement cost of the shell can be significantly suppressed. In addition, since each of the wafer shells has, as the finishing blade, each blade corresponding to the tooth groove in the piece to be cut, when the finishing blades are formed in the wafer shells, there is no concern of interference of a grinding wheel or the like for forming the finishing blades with the adjacent blades, and the finishing blades can be formed in various shapes by setting the relief angle (second relief) of the blade to be large or the like.

According to the helical broach according to the second invention, since the installation position of each of the wafer shells is moved toward the leading end of the cutting direction, the finishing blades which are reduced in size due to re-grinding or the like are not immediately discarded but are re-used. Therefore, the use period of each of the wafer shells can be significantly increased and thus the running cost of the shell can be significantly suppressed.

According to the helical broach according to the third invention, since the finishing blades in the wafer shells cut both of the tooth surfaces along the tooth lead in the piece to be cut, the number of finishing blades can be reduced. Therefore, the axial length of the shell can be reduced, and thus a reduction in the size of the helical broach can be achieved.

According to the helical broach according to the fourth invention, since all of the tool angles at which the finishing blades in the wafer shells cut both of the tooth surfaces along the tooth lead in the piece to be cut are appropriate acute angles for cutting, the work accuracy and the surface precision of the cut surfaces of the piece to be cut can be enhanced. In addition, the cutting amounts of the finishing blades can be set to sufficiently large amounts, and thus the number of finishing blades can be reduced. Therefore, the axial length of the shell can be reduced, and thus a reduction in the size of the helical broach can be achieved.

DESCRIPTION OF EMBODIMENTS

Hereinafter, an embodiment of a helical broach according to the present invention will be described in detail with reference to the accompanying drawings. As a matter of course, the present invention is not limited to the following embodiment, and it is natural that various modifications can be made without departing from the spirit of the present invention.

Embodiment 1

First, the structure of the helical broach according to Embodiment 1 of the present invention will be described with reference to FIGS. 1 to 3.

A helical broach 1 according to this embodiment is a cutting tool for forming a substantially cylindrical workpiece W which is a piece to be cut, to a helical internal gear having a tooth gear helix angle $\alpha$. As illustrated in FIG. 1, the helical broach 1 includes a shank section 2 to be installed in a broaching machine (not illustrated), a roughing section 3 for roughing of the workpiece W, and a finishing section 4 for finishing of the rough-worked workpiece W and is formed by assembling a plurality of (in this embodiment, N) wafer shells $20_{W(1)}$, $20_{W(2)}$, ..., $20_{W(N)}$ as a shell constituting the finishing section 4, to a broach body 10 having the shank section 2 and the roughing section 3.

In the roughing section 3, roughing blades (not illustrated) having a tooth gear helix angle $\alpha$ are formed integrally with the broach body 10 to protrude toward the outer peripheral side of the helical broach 1 in the radial direction and form a plurality of blade groups corresponding to each of the tooth grooves in the workpiece W. In addition, in order to form teeth having predetermined dimensions in the workpiece W, the roughing blades in the blade groups are arranged along the tooth gear helix angle $\alpha$ such that the height of the blades gradually increases from the leading end of the cutting direction (the left side in FIG. 1) toward the trailing end of the cutting direction (the right side in FIG. 1).

In the finishing section 4, the plurality of wafer shells $20_{W(1)}$ to $20_{W(N)}$ which are substantially cylindrical are arranged in the axial direction of the helical broach 1 and are assembled to the broach body 10. In the wafer shells $20_{W(1)}$ to $20_{W(N)}$, as illustrated in FIG. 2, finishing blades $30_{W(1)}$ to $30_{W(N)}$ having a tooth gear helix angle α are formed to protrude toward the outer peripheral side of the wafer shells $20_{W(1)}$ to $20_{W(N)}$ in the radial direction, and since the wafer shells $20_{W(1)}$ to $20_{W(N)}$ are sequentially arranged along the axial direction of the helical broach 1, the finishing blades $30_{W(1)}$ to $30_{W(N)}$ form a plurality of blade groups which follow the tooth gear helix angle α to correspond to each of the tooth grooves in the workpiece W.

Figure 2:
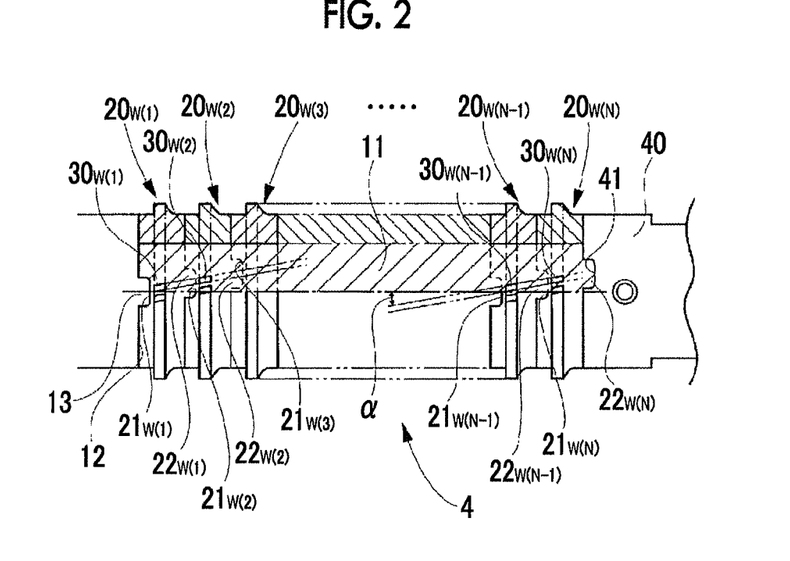
FIG. 2 is a side view and a longitudinal sectional view illustrating wafer shells of the helical broach of Embodiment 1.

In order to form teeth having predetermined dimensions in the workpiece W, the finishing blades $30_{W(1)}$ to $30_{W(N)}$ in the blade groups are arranged such that the width of the blades gradually increases with each of the wafer shells $20_{W(1)}$ to $20_{W(N)}$ from the leading end of the cutting direction, (the left side in FIG. 2) toward the trailing end of the cutting direction (the right side in FIG. 2).

That is, in the first wafer shell $20_{W(1)}$ from the leading end of the cutting direction, the first smallest blades are respectively provided in the blade groups, and in the second wafer shell $20_{W(2)}$ from the leading end of the cutting direction, the second smallest blades are respectively provided in the blade groups. In the same manner, in the third to N-th wafer shells $20_{W(3)}$ to $20_{W(N)}$ from the leading end of the cutting direction, the third to N-th smallest blades are respectively provided in the blade groups.

As a matter of course, the number of each of finishing blades $30_{W(1)}$ to $30_{W(N)}$ respectively provided in the wafer shells $20_{W(1)}$ to $20_{W(N)}$ is not limited to one in each of the blade groups as in this embodiment and a plurality of blades may also be provided in each of the blades. Considering the degree of freedom of the shapes of the respective finishing blades $30_{W(1)}$ to $30_{W(N)}$ provided in the wafer shells $20_{W(1)}$ to $20_{W(N)}$, which will be described later, it is preferable that the number of blades in each of the blade groups is one.

Figure 1:
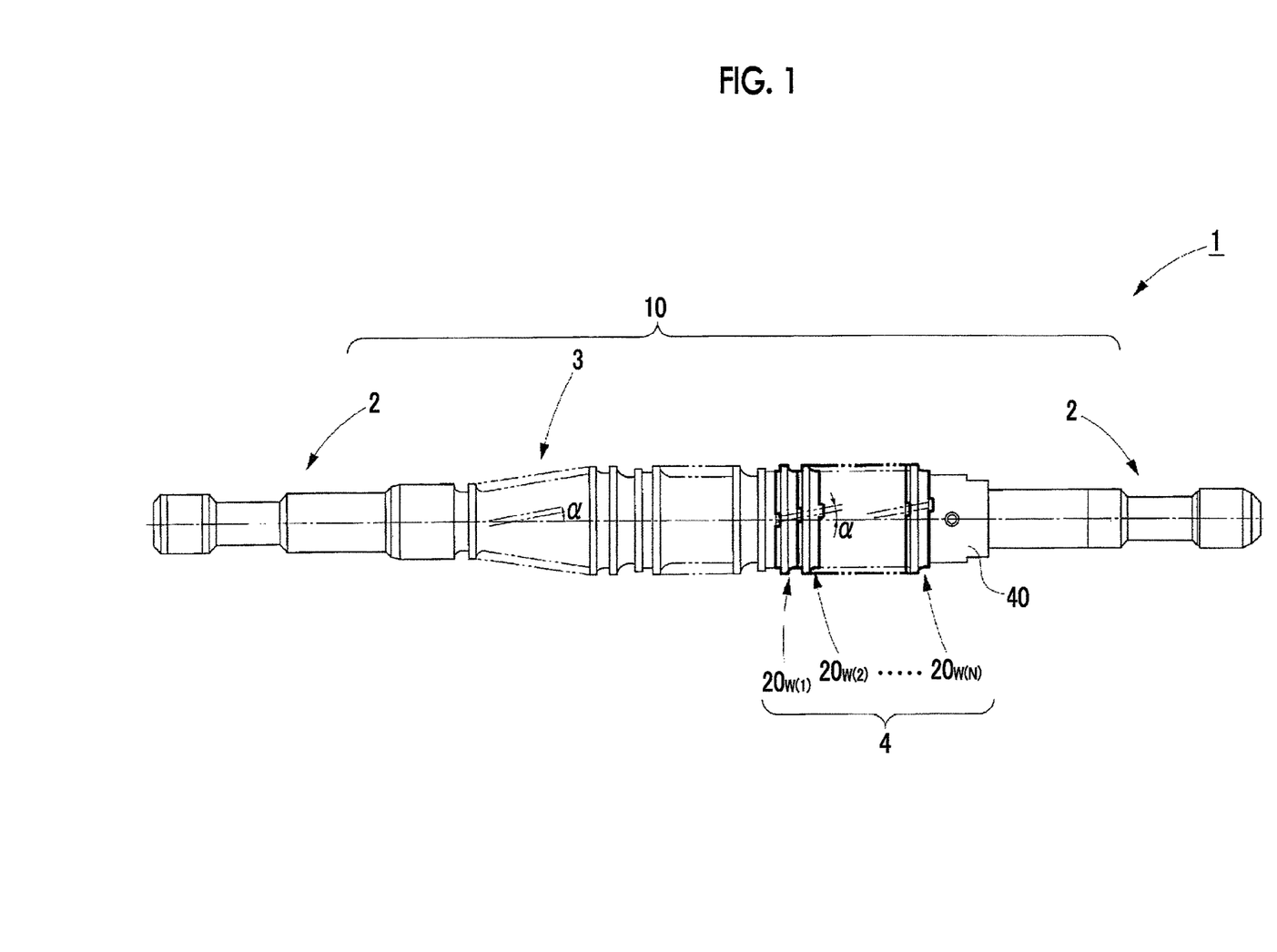
FIG. 1 is a side view illustrating a helical broach according to Embodiment 1.

As illustrated in FIGS. 1 and 2, the wafer shells $20_{W(1)}$ to $20_{W(N)}$ are arranged in the axial direction of the helical broach 1, are engaged with a shell engagement portion 11 of the broach body 10, and are assembled such that the first wafer shell $20_{W(1)}$ from the leading end of the cutting direction abuts a shell abutting surface 12 of the broach body 10, and the N-th wafer shell $20_{W(N)}$ from the leading end of the cutting direction is pressed toward the leading end of the cutting direction by a fastener 40 together with the first to (N−1)-th wafer shells $20_{W(1)}$ to $20_{W(N-1)}$ from the leading end of the cutting direction (the left side in FIGS. 1 and 2) positioned closer to the leading end of the cutting direction than the N-th wafer shell $20_{W(N)}$. In addition, the fastener 40 is fixed to the broach body 10 by a bolt (not illustrated) or the like.

In order to relatively align the phases in the peripheral direction (around the axis of the helical broach 1) in the broach body 10 and the wafer shells $20_{W(1)}$ to $20_{W(N)}$, a positioning protrusion 13 is provided in the shell abutting surface 12, positioning grooves $21_{W(1)}$ to $21_{W(N)}$ are respectively provided in one end (the left end in FIG. 2) of the wafer shells $20_{W(1)}$ to $20_{W(N)}$, positioning protrusions $22_{W(1)}$ to $22_{W(N)}$ are provided in the other end (the right end in FIG. 2) of the wafer shells $20_{W(1)}$ to $20_{W(N)}$, and a positioning groove 41 is provided in one end (the left end in FIG. 2) of the fastener 40.

The positioning protrusion 13 of the shell abutting surface 12 and the positioning groove $21_{W(1)}$ of the first wafer shell $20_{W(1)}$ from the leading end of the cutting direction are fitted to each other, and the positioning protrusion $22_{W(1)}$ of the first wafer shell $20_{W(1)}$ from the leading end of the cutting direction and the positioning groove $21_{W(2)}$ of the second wafer shell $20_{W(2)}$ from the leading end of the cutting direction are fitted to each other. In the same manner, in the second to N-th wafer shells $20_{W(2)}$ to $20_{W(N)}$ from the leading end of the cutting direction, the positioning protrusions $21_{W(2)}$ to $21_{W(N)}$ are respectively fitted to the corresponding positioning grooves $22_{W(2)}$ to $22_{W(N)}$ in the wafer shells $20_{W(2)}$ to $20_{W(N)}$ such that the wafer shells $20_{W(1)}$ to $20_{W(N)}$ are assembled to the broach body 10 in a state in which the positioning protrusion $22_{W(N)}$ of the wafer shell $20_{W(N)}$ positioned at the N-th position (at the rearmost end in the cutting direction) from the leading end of the cutting direction is fitted to the positioning groove 41 of the fastener 40, that is, in a state in which the phases are relatively aligned with each other.

The positioning grooves $21_{W(1)}$ to $21_{W(N)}$ and the positioning protrusions $22_{W(1)}$ to $22_{W(N)}$ in the wafer shells $20_{W(1)}$ to $20_{W(N)}$, are provided at predetermined positions with respect to the finishing blades $30_{W(1)}$ to $30_{W(N)}$ in the wafer shells $20_{W(1)}$ to $20_{W(N)}$. That is, the installation positions of the positioning grooves $21_{W(1)}$ to $21_{W(N)}$ and the positioning protrusions $22_{W(1)}$ to $22_{W(N)}$ with respect to the finishing blades $30_{W(1)}$ to $30_{W(N)}$ are the same in any of the wafer shells $20_{W(1)}$ to $20_{W(N)}$.

Therefore, when the wafer shells $20_{W(1)}$ to $20_{W(N)}$ are assembled to the broach body 10 in dimensional order such that the blade width gradually increases, as illustrated in FIG. 2, the finishing blades $30_{W(1)}$ to $30_{W(N)}$ are positioned to be arranged to follow the tooth gear helix angle α, and the positioning grooves $21_{W(1)}$ to $21_{W(N)}$ and the positioning protrusions $22_{W(1)}$ to $22_{W(N)}$ are positioned to also be arranged to follow the tooth gear helix angle α in the wafer shells $20_{W(1)}$ to $20_{W(N)}$.

The finishing blades $30_{W(1)}$ to $30_{W(N)}$ are individually worked by a working machine (not illustrated) and a grinding wheel (not illustrated) to be formed in the wafer shells $20_{W(1)}$ to $20_{W(N)}$. The finishing blades $30_{W(1)}$ to $30_{W(N)}$ are provided such that the blade width gradually increases with each of the wafer shells $20_{W(1)}$ to $20_{W(N)}$. Therefore, in each of the wafer shells $20_{W(1)}$ to $20_{W(N)}$, the blades are not adjacent to each other along the tooth gear helix angle α. Accordingly, when the finishing blades $30_{W(1)}$ to $30_{W(N)}$ are formed in the wafer shells $20_{W(1)}$ to $20_{W(N)}$, there is no concern of the grinding wheel interfering with the adjacent blades, and the finishing blades $30_{W(1)}$ to $30_{W(N)}$ can be formed in various shapes by setting the relief angle (second relief) of the blade to be large or the like.

That is, compared to the finishing blades 130 (FIGS. 4 and 5) in the integration type shell 120 of the existing helical broach 101, in the wafer shells $20_{W(1)}$ to $20_{W(N)}$ which are division type shells of the helical broach 1 according to this embodiment, the degree of freedom of the shapes of the finishing blades $30_{W(1)}$ to $30_{W(N)}$ formed by the grinding wheel or the like is high.

In this embodiment, the finishing blades $30_{W(1)}$ to $30_{W(N)}$ in the wafer shells $20_{W(1)}$ to $20_{W(N)}$ are set to cut both tooth surfaces 50 and 60 including the left tooth surface 50 (one tooth surface along the tooth lead of the workpiece W) and the right tooth surface 60 (the other tooth surface along the tooth lead of the workpiece W) in each workpiece W and cut each of both tooth surfaces 50 and 60 in the workpiece W with the same cutting amount $d_{W(1)}$ to $d_{W(N)}$.

In addition, in this embodiment, the finishing blades $30_{W(1)}$ to $30_{W(N)}$ in the wafer shells $20_{W(1)}$ to $20_{W(N)}$ are set to cut both of the left tooth surface 50 and the right tooth surface 60 in the workpiece W with tool angles $\theta_{W(1)}$ to $\theta_{W(N)}$ and are set so as to allow the tool angles $\theta_{W(1)}$ to $\theta_{W(N)}$ to be appropriate acute angles for the cutting.

In general, in the working blades of a cutting tool, a cutting portion having an acute angle has a higher cutting ability than that of those having an obtuse angle and enables cutting with good surface roughness for cut surfaces.

Therefore, in this embodiment, the finishing blades $30_{W(1)}$ to $30_{W(N)}$ in the wafer shells $20_{W(1)}$ to $20_{W(N)}$ are set so as to allow the tool angles $\theta_{W(1)}$ to $\theta_{W(N)}$ with which both of the tooth surfaces 50 and 60 in the workpiece W are cut to be an acute angle.

That is, in this embodiment, the wafer shells $20_{W(1)}$ to $20_{W(N)}$ are wafer shells for both tooth surfaces in which the finishing blades $30_{W(1)}$ to $30_{W(N)}$ that cut both of the left tooth surface 50 and the right tooth surface 60 in the workpiece W with the acute tool angles $\theta_{W(1)}$ to $\theta_{W(N)}$ are provided.

As a matter of course, the helical broach according to the present invention is not limited to the finishing blades for both tooth surfaces as in this embodiment and may also be applied to finishing blades that cut one tooth surface at a time. In addition, the cutting amounts $d_{W(1)}$ to $d_{W(N)}$ and the tool angles $\theta_{W(1)}$ to $\theta_{W(N)}$ with which the left tooth surface 50 and the right tooth surface 60 in the workpiece W are cut may have numerical values that vary between the left tooth surface 50 and the right tooth surface 60.

Subsequently, the finishing of the helical broach according to Embodiment 1 of the present invention will be described with reference to FIGS. 1 to 3.

The helical broach 1 according to Embodiment 1 of the present invention and the workpiece W are installed in the broaching machine (not illustrated), and when the helical broach 1 is moved in the axial direction while being pulled with respect to the workpiece W, the workpiece W can be formed to the helical internal gear as described below.

First, the roughing blades (not illustrated) in the roughing section 3 of the helical broach 1 come into contact with the inner peripheral surface of the substantially cylindrical workpiece W. By the roughing blades arranged such that the height of the blades gradually increases from the leading end of the cutting direction toward the trailing end of the cutting direction, teeth having predetermined dimensions are formed in the workpiece W.

Figure 3:
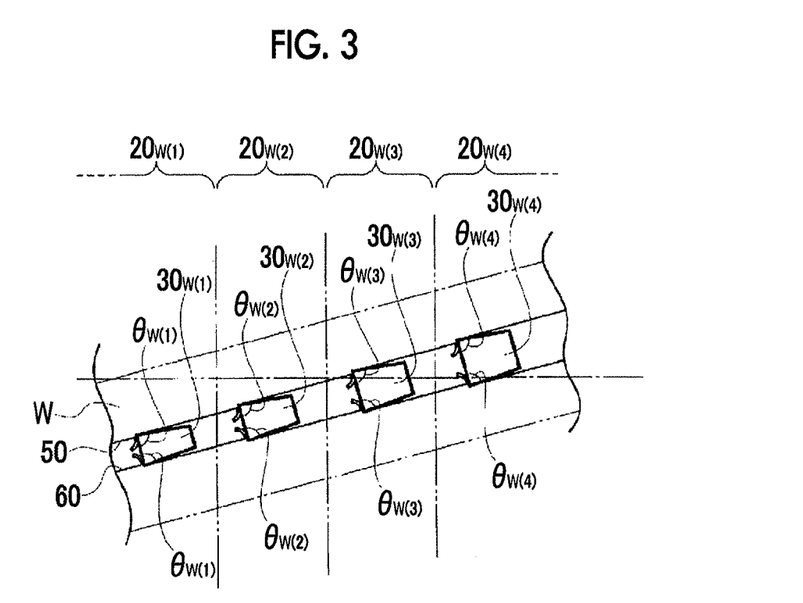
FIG. 3 is an explanatory view illustrating finishing by the helical broach according to Embodiment 1.

Next, as illustrated in FIG. 3, the finishing blade $30_{W(1)}$ in the first wafer shell $20_{W(1)}$ positioned at the first position from the leading end of the cutting direction in the finishing section 4 of the helical broach 1 comes into contact with the left tooth surface 50 and the right tooth surface 60 in the workpiece W subjected to roughing. The finishing blade $30_{W(1)}$ abuts both of the tooth surfaces 50 and 60 in the workpiece W with the cutting amount $d_{W(1)}$. Therefore, both of the tooth surfaces 50 and 60 in the workpiece W subjected to roughing are cut with the cutting amount $d_{W(1)}$.

Subsequently, the finishing blade $30_{W(2)}$ in the second wafer shell $20_{W(2)}$ positioned at the second position from the leading end of the cutting direction in the finishing section 4 of the helical broach 1 comes into contact with the left tooth surface 50 and the right tooth surface 60 cut by the finishing blade $30_{W(1)}$ in the first wafer shell $20_{W(1)}$. The finishing blade $30_{W(2)}$ abuts both of the tooth surfaces 50 and 60 in the workpiece W with the cutting amount $d_{W(2)}$. Therefore, both of the tooth surfaces 50 and 60 in the workpiece W are further cut with the cutting amount $d_{W(2)}$.

In the same manner, the finishing blades $30_{W(3)}$ to $30_{W(N)}$ in the third to N-th wafer shells $20_{W(3)}$ to $20_{W(N)}$ positioned at the third to N-th positions from the leading end of the cutting direction in the finishing section 4 of the helical broach 1 sequentially come into contact with the left tooth surface 50 and the right tooth surface 60 in the workpiece W. The finishing blades $30_{W(3)}$ to $30_{W(N)}$ sequentially abut both of the tooth surfaces 50 and 60 in the workpiece W with the cutting amounts $d_{W(3)}$ to $d_{W(N)}$. Therefore, both of the tooth surfaces 50 and 60 in the workpiece W are further cut sequentially with the cutting amounts $d_{W(3)}$ to $d_{W(N)}$.

That is, by the finishing blades $30_{W(1)}$ to $30_{W(N)}$ that are arranged such that the blade width gradually increases from the leading end of the cutting direction toward the trailing end of the cutting direction, the left tooth surface 50 and the right tooth surface 60 in the workpiece W are cut sequentially with the cutting amounts $d_{W(1)}$ to $d_{W(N)}$ to predetermined finished dimensions.

As described above, by broaching using the helical broach 1 according to Embodiment 1 of the present invention, the left tooth surface 50 and the right tooth surface 60 in the workpiece W are accurately cut to predetermined finished dimensions, thereby forming a helical internal gear having high accuracy.

Next, a case where the finishing blades $30_{W(1)}$ to $30_{W(N)}$ of the finishing section 4 in the helical broach according to Embodiment 1 of the present invention are in a state of being unable to cut the workpiece W to predetermined dimensions due to wear and the like will be described with reference to FIGS. 1 to 3.

The finishing blades $30_{W(1)}$ to $30_{W(N)}$ in the finishing section 4 wear due to the repeated broaching operations using the helical broach 1 according to Embodiment 1 of the present invention described above. During cutting by the worn finishing blades $30_{W(1)}$ to $30_{W(N)}$, the left tooth surface 50 and the right tooth surface 60 in the workpiece W cannot be cut with the predetermined cutting amounts $d_{W(1)}$ to $d_{W(N)}$. That is, the workpiece W cannot be formed to a helical internal gear having predetermined dimensions.

First, each of the wafer shells $20_{W(1)}$ to $20_{W(N)}$ are removed from the broach body 10, and the finishing blades $30_{W(1)}$ to $30_{W(N)}$ in the wafer shells $20_{W(1)}$ to $20_{W(N)}$ are re-ground to predetermined dimensions so as to be able to form the workpiece W to a helical internal gear having predetermined dimensions.

When wear and re-grinding of the finishing blades $30_{W(1)}$ to $30_{W(N)}$ in the wafer shells $20_{W(1)}$ to $20_{W(N)}$ are repeated, the ground surfaces of the finishing blades $30_{W(1)}$ to $30_{W(N)}$ in the finishing section 4 reach the second relief and thus the blade width of the finishing blades $30_{W(1)}$ to $30_{W(N)}$ becomes too small. That is, even when the finishing blades $30_{W(1)}$ to $30_{W(N)}$ are re-ground, the finishing blades $30_{W(1)}$ to $30_{W(N)}$ cannot have predetermined dimensions and cannot cut the left tooth surface 50 and the right tooth surface 60 in the workpiece W with the predetermined cutting amounts $d_{W(1)}$ to $d_{W(N)}$. Particularly, the finishing blade $30_{W(N)}$ positioned at the rearmost end of the cutting direction determines the final dimensions of the workpiece W and is thus important. When the finishing blade $30_{W(N)}$ is reduced in size, the workpiece W cannot be formed to a helical internal gear having predetermined dimensions.

In this embodiment, in a case where the finishing blade $30_{W(N)}$ positioned at the rearmost end of the cutting direction is reduced in size, a new wafer shell $20_{W(N+1)}$ having a finishing blade $30_{W(N+1)}$ having predetermined dimensions is inserted into the (N+1)-th position from the leading end of the cutting direction which is closer to the trailing end of the cutting direction than the wafer shell $20_{W(N)}$ positioned at the N-th position from the leading end of the cutting direction, that is, into the rearmost end of the cutting direction. Accordingly, the workpiece W is finally cut by the new finishing blade $30_{W(N+1)}$ positioned at the rearmost end of the cutting direction, and thus the workpiece W can be formed to a helical internal gear having predetermined dimensions.

In addition, since the new wafer shell $20_{W(N+1)}$ is inserted into the rearmost end of the cutting direction, the number of wafer shells $20_{W(1)}$ to $20_{W(N+1)}$ is increased and thus the finishing section 4 is elongated in the axial direction. Here, the wafer shell $20_{W(1)}$ positioned at the foremost end of the cutting direction is removed.

The finishing blade $30_{W(1)}$ in the wafer shell $20_{W(1)}$ positioned at the foremost end of the cutting direction is also reduced in size due to the wear and the repeated re-grinding operations and is thus in a state of being unable to sufficiently cut both of the tooth surfaces 50 and 60 in the workpiece W subjected to roughing. Therefore, it may be considered that the finishing blade $30_{W(1)}$ needs to be discarded.

In addition, initially, since the finishing blade $30_{W(2)}$ in the second wafer shell $20_{W(2)}$ positioned at the second position from the leading end of the cutting direction is also reduced in size due to the wear and the repeated re-grinding operations, by the re-grinding operations, the finishing blade $30_{W(2)}$ is further re-ground to the dimensions corresponding to the finishing blade $30_{W(1)}$ in the first wafer shell $20_{W(1)}$ initially positioned at the first position from the leading end of the cutting direction. The second wafer shell $20_{W(2)}$ positioned at the second position is moved toward the leading end of the cutting direction to serve as the first wafer shell $20_{W(1)}$ positioned at the first position.

In the same manner, the finishing blades $30_{W(3)}$ to $30_{W(N)}$ in the third to N-th wafer shells $20_{W(3)}$ to $20_{W(N)}$ initially positioned at the third to N-th positions are re-ground to the dimensions corresponding to the finishing blades $30_{W(2)}$ to $30_{W(N-1)}$ in the second to (N−1)-th wafer shells $20_{W(2)}$ to $20_{W(N-1)}$ initially positioned at the second to (N−1)-th positions from the leading end of the cutting direction, and the third to N-th wafer shells $20_{W(3)}$ to $20_{W(N)}$ initially positioned at the third to N-th positions are moved toward the leading end of the cutting direction to serve as the second to (N−1)-th wafer shells $20_{W(2)}$ to $20_{W(N-1)}$ positioned at the second to (N−1)-th positions.

In this embodiment, the positioning grooves $21_{W(1)}$ to $21_{W(N)}$ and the positioning protrusions $22_{W(1)}$ to $22_{W(N)}$ in the wafer shells $20_{W(1)}$ to $20_{W(N)}$ are provided at predetermined positions with respect to the finishing blades $30_{W(1)}$ to $30_{W(N)}$ in the wafer shells $20_{W(1)}$ to $20_{W(N)}$. Therefore, in a case where the installation positions of the second to N-th wafer shells $20_{W(2)}$ to $20_{W(N)}$ are moved toward the leading end of the cutting direction as described above, the second to N-th wafer shells $20_{W(2)}$ to $20_{W(N)}$ are assembled while being slightly changed in phases along the tooth gear helix angle $\alpha$.

That is, the positions of the finishing blades $30_{W(2)}$ to $30_{W(N)}$ in the helical broach 1, that is, the positions of the finishing blades $30_{W(2)}$ to $30_{W(N)}$ in the finishing section 4 with respect to the roughing blades (not illustrated) in the roughing section 3 are not changed. Therefore, there is no influence on the cutting of the workpiece W during broaching.

As described above, by inserting the new wafer shell $20_{W(N+1)}$ into the rearmost end of the cutting direction and removing the wafer shell $20_{W(1)}$ positioned at the foremost end of the cutting direction, a new shell can be formed.

In the helical broach 1 according to this embodiment, as illustrated in FIG. 3, the left tooth surface 50 and the right tooth surface 60 of the workpiece W can be cut with the tool angles $\theta_{W(1)}$ to $\theta_{W(N)}$ of the finishing blades $30_{W(1)}$ to $30_{W(N)}$ in the wafer shells $20_{W(1)}$ to $20_{W(N)}$, and thus the surface roughness of the cut surfaces cut by the finishing blades $30_{W(1)}$ to $30_{W(N)}$ is good and the cutting amounts $d_{W(1)}$ to $d_{W(N)}$ can be set to sufficiently large amounts.

Therefore, the number of finishing blades in the finishing section 4 along the tooth gear helix angle $\alpha$ can be reduced, that is, the number of wafer shells $20_{W(1)}$ to $20_{W(N)}$ can be reduced. Accordingly, the axial length of the wafer shells $20_{W(1)}$ to $20_{W(N)}$ as the shell can be reduced to be smaller than the axial length of the existing shell 120.

In addition, it is preferable that the cutting conditions such as the cutting amounts $d_{W(1)}$ to $d_{W(N)}$ and the tool angles $\theta_{W(1)}$ to $\theta_{W(N)}$ of the finishing blades $30_{W(1)}$ to $30_{W(N)}$ in the wafer shells $20_{W(1)}$ to $20_{W(N)}$ are equally set. By equally setting the cutting conditions of the finishing blades $30_{W(1)}$ to $30_{W(N)}$, the wear times and wear amounts of the finishing blades $30_{W(1)}$ to $30_{W(N)}$ are equal to each other. Therefore, the replacement times of the wafer shells $20_{W(1)}$ to $20_{W(N)}$ can be substantially adjusted.

Accordingly, not all the wafer shells $20_{W(1)}$ to $20_{W(N)}$ corresponding to the shell are not discarded, and the wafer shells $20_{W(1)}$ to $20_{W(N)}$ positioned at the rearmost end of the cutting direction are sequentially replaced at the leading end of the cutting direction as the finishing blades $30_{W(1)}$ to $30_{W(N)}$ wear. Therefore, the wafer shells $20_{W(1)}$ to $20_{W(N)}$ as the shell can be used for a longer period than the typical shell.

REFERENCE SIGNS LIST

1 HELICAL BROACH
2 SHANK SECTION
3 ROUGHING SECTION
4 FINISHING SECTION
10 BROACH BODY
11 SHELL ENGAGEMENT PORTION OF BROACH BODY
12 SHELL ABUTTING SURFACE OF BROACH BODY
13 POSITIONING PROTRUSION OF BROACH BODY
20 WAFER SHELL
21 POSITIONING GROOVE OF WAFER SHELL
22 POSITIONING PROTRUSION OF WAFER SHELL
30 FINISHING BLADE
40 FASTENER
41 POSITIONING GROOVE OF FASTENER
50 LEFT TOOTH SURFACE IN WORKPIECE
60 RIGHT TOOTH SURFACE IN WORKPIECE

The invention claimed is:

1. A helical broach comprising:
   a cylindrical shell in which finishing blades having a predetermined tooth gear helix angle, with respect to an axial direction of the helical broach, corresponding to tooth grooves in a piece to be cut are formed on an outer peripheral side,
   wherein the cylindrical shell includes a plurality of wafer shells assembled coaxially and side by side along an axial direction of the helical broach, each wafer shell having finishing blades having the predetermined tooth gear helix angle with respect to the axial direction; and
   in the finishing blades in the plurality of wafer shells, a blade width gradually increases with each of the wafer shells from a leading end of a cutting direction toward a trailing end of the cutting direction.

2. The helical broach according to claim 1,
   wherein, in a case where the finishing blade provided in a wafer shell positioned at a rearmost end of the cutting direction is in a state of being unable to cut the piece to be cut to predetermined dimensions, a new wafer shell is inserted into the rearmost end of the cutting direction, and a wafer shell positioned at a foremost end of the cutting direction is removed and installation positions of the plurality of wafer shells assembled and arranged in the axial direction are moved toward the leading end of the cutting direction, thereby forming a new cylindrical shell.

3. The helical broach according to claim 1,
wherein the finishing blades in the plurality of wafer shells cut both tooth surfaces along a tooth lead in the piece to be cut.

4. The helical broach according to claim 3,
wherein all of tool angles at which the finishing blades in the plurality of wafer shells abut both of the tooth surfaces along the tooth lead in the piece to be cut are acute angles.

* * * * *